(12) United States Patent
Lau You Hin et al.

(10) Patent No.: US 12,407,161 B2
(45) Date of Patent: Sep. 2, 2025

(54) METHOD FOR CONTROLLING AN INVERTER COMPRISING SELECTING A SAFETY MODE

(71) Applicant: NIDEC PSA EMOTORS, Carrieres sous Poissy (FR)

(72) Inventors: Julien Lau You Hin, Nogent sur Marne (FR); Michael Chemin, La Queue en Brie (FR)

(73) Assignee: Nidec PSA Emotors, Carrieres sous Poissy (FR)

( * ) Notice: Subject to any disclaimer, the term of this patent is extended or adjusted under 35 U.S.C. 154(b) by 0 days.

(21) Appl. No.: 18/842,008

(22) PCT Filed: Feb. 15, 2023

(86) PCT No.: PCT/FR2023/050202
§ 371 (c)(1),
(2) Date: Aug. 27, 2024

(87) PCT Pub. No.: WO2023/187274
PCT Pub. Date: Oct. 5, 2023

(65) Prior Publication Data
US 2025/0112453 A1    Apr. 3, 2025

(30) Foreign Application Priority Data

Mar. 31, 2022 (FR) ..................... 2202964

(51) Int. Cl.
*H02H 7/08* (2006.01)
*H02H 3/02* (2006.01)
(Continued)

(52) U.S. Cl.
CPC .............. *H02H 7/08* (2013.01); *H02H 3/023* (2013.01); *H02H 7/122* (2013.01); *H02M 1/325* (2021.05);
(Continued)

(58) Field of Classification Search
CPC .......... H02P 27/06; H02P 3/22; H02P 29/024; H02P 29/032; H02H 7/00; H02H 9/047; H02M 1/0058
See application file for complete search history.

(56) References Cited

U.S. PATENT DOCUMENTS 7,279,862 B1    10/2007 Welchko et al.
2015/0214858 A1   7/2015 Raichle et al.
(Continued)

FOREIGN PATENT DOCUMENTS

DE    10 2012 002 023 A1   12/2012

OTHER PUBLICATIONS

International Search Report for corresponding PCT/FR2023/050202 mailed Jul. 5, 2023.
(Continued)

*Primary Examiner* — Said Bouziane
(74) *Attorney, Agent, or Firm* — Sandberg Phoenix & von Gontard P.C.

(57) ABSTRACT

A method is disclosed for controlling an inverter controlled by a first control device in a nominal operating mode and by a second control device to apply a safety operating mode chosen from an Active Short Circuit (ASC) mode and a freewheeling (FW) mode. The method comprises determining the voltage on a high-voltage bus (UHVDC). If the voltage is lower than a first voltage threshold (Uthi), the FW mode is selected; if the voltage is greater than a second voltage threshold (Uth2) greater than Uthi, the ASC mode is selected; and if the voltage is between Uthi and Uth2, a parameter representative of the ability to inject power onto the UHVDC in a risk free manner is determined. If this parameter is greater than or equal to a threshold value, ASC mode is selected and if the parameter is lower than the threshold value, FW mode is selected.

14 Claims, 2 Drawing Sheets

(51) Int. Cl.
  *H02H 7/122* (2006.01)
  *H02M 1/32* (2007.01)
  *H02M 7/5387* (2007.01)
  *H02P 29/024* (2016.01)
  *H02P 29/032* (2016.01)
(52) U.S. Cl.
  CPC ........ *H02M 7/5387* (2013.01); *H02P 29/024* (2013.01); *H02P 29/032* (2016.02)

(56) References Cited

U.S. PATENT DOCUMENTS

| | | |
|---|---|---|
| 2016/0303978 A1 | 10/2016 | Merkel et al. |
| 2022/0014140 A1 | 1/2022 | Singh et al. |
| 2024/0022202 A1* | 1/2024 | Salle .................... H02P 29/027 |

OTHER PUBLICATIONS

Written Opinion for corresponding PCT/FR2023/050202 mailed Jul. 5, 2023.

\* cited by examiner

METHOD FOR CONTROLLING AN INVERTER COMPRISING SELECTING A SAFETY MODE

CROSS-REFERENCE TO RELATED APPLICATIONS

This application is the US National Stage under 35 USC § 371 of International Application No. PCT/FR2023/050202, filed Feb. 15, 2023, which claims priority of French application 2202964 filed on Mar. 31, 2022, the content (text, drawings and claims) of both said applications being incorporated by reference herein.

BACKGROUND

The methods and devices described herein relate to the control of an inverter used to control an electric machine for the traction of a vehicle. They relate more precisely to the selection and application of a safety mode in the event of failure of the inverter control means and apply in particular to traction systems comprising a synchronous machine with permanent magnets.

The inverter is a device making it possible, for example, to generate an alternating current from a direct current coming from an electrical source such as a battery.

The inverters include a power stage including, for example, power modules, and more generally the power electronics of the inverter. The power stage includes a set of electronic switches. Several electronic switch technologies can be used in an inverter which is used in an electric traction system of a vehicle, including:
  Insulated Gate Bipolar Transistors (IGBTs), and
  Metal Oxide Semiconductor Field-Effect Transistors (MOSFETs), in particular Silicon Carbide (SiC) power transistors.

Thus, in a power module, by means of a set of appropriately controlled switches, the source is modulated in order to obtain an alternating signal of the desired frequency.

The power stage of the inverter is powered by the electrical source (i.e. generally the battery) via a high-voltage direct current (HVDC) bus.

This voltage, greater than 60V (for example of the order of 200V, 400V, or 800V) corresponds in particular to the voltage of the current which is transformed by the inverter to power an electric machine of the vehicle.

The inverter is controlled by a controller that generally comprises a microcontroller.

Nevertheless, it is necessary to provide a solution in the event of the control device failing, i.e. in any situation where it is no longer able to control the inverter correctly. This can happen in the event of a power supply failure, but also in the event of a software failure, or any other unexpected situation.

In such a situation, the inverter is controlled in a safety mode. In order to cover all failures and all life situations, managing the safety status requires having two redundant and independent electronic functions capable of managing the safety status.

Thus, a second microcontroller can be provided as a redundant electronic function with respect to the microcontroller used in normal operation (main microcontroller), allowing for the inverter to be controlled in the event of failure of the main microcontroller. Note that if the failure of the main microcontroller results from a power supply failure, the second microcontroller can be supplied by an auxiliary power supply (generally of the "flyback" type, sometimes translated as "indirect transfer"), corresponding to an electrical capacity (typically one or more capacitors) internal to the inverter.

As an alternative to a second microcontroller, other complex components can also be used, such as a CPLD (Complex Programmable Logic Device) or a FPGA (Field Programmable Gate Array), which refers to a complex electronic component sometimes called a "pre-diffused network of user-programmable gates"). Such a complex component is referred to hereafter as a "programmable logic component".

For a permanent magnet synchronous motor (PMSM), there are two relevant safety modes.

A first safety mode is the Active Short Circuit (ASC) mode.

In ASC mode, the phases of the electric machine are short-circuited. In this case, the electric machine is isolated from the HVDC bus.

Without ASC mode, loss of inverter control would leave electronic switches (e.g. IGBTs) in an open, non-conductive state. This could prove critical when the electric machine is running at high speed, as the rotor would then induce a voltage in the stator phases that could exceed the electrical potential of the inverter. A current would then flow through the diodes of the power electronic switches, leading to uncontrolled charging of the inverter capacitors. ASC mode provides a solution to this situation, to prevent damage to the inverter or battery. In this ASC mode, certain electronic switches in the power stage of the inverter, i.e. those located on the same side of the H-bridges formed in the inverter, are closed so that they allow current to flow. The poles of the electric machine (typically three for a three-phase motor) are then short-circuited. However, while ASC mode ensures that no unwanted regeneration operations take place, a large current can flow in the phases of the electric machine, potentially leading to overheating. ASC mode should therefore preferably not be used for long periods.

A second safety mode is "freewheeling" or FW mode. In FW mode, the electronic switches of the inverter are all in the open state, and therefore do not allow current to flow. In FW mode, the electric machine is not disconnected from the HVDC bus.

As a result, when the electric machine is driven at high rotational speed, an induced current flows through the diodes of the electronic switches and recharges the inverter capacitors (as explained above).

In other words, application of the FW mode can induce a current in the electric machine and inverter, and inject energy into the high-voltage bus. If the battery is disconnected from the high-voltage bus, this can cause a voltage rise in the high-voltage part of the inverter circuit (high-voltage bus), and therefore in the inverter capacitors. The inverter switches can then be damaged by the temperature. By way of example, the maximum permissible temperature is around 175° C. for IGBTs. If the battery is connected to the high-voltage bus, this can lead to uncontrolled regeneration (recharging) and excessive electrical braking of the electric machine (and, where applicable, of the vehicle fitted with it).

However, if the speed of the electric machine is low enough (so that the rectified counter-electromotive force is low enough), there is no risk of untimely regenerative operation or overvoltage. In addition, no current flows through the electric machine lines, which prevents any risk of system overheating.

This mode should therefore normally be reserved for situations of low rotational speed of the electric machine.

SUMMARY

The described methods and devices aim to solve the above-mentioned problems.

In particular, the aim is to propose control of the inverter in the event of failure of the main microcontroller, by virtue of an electronic function that is redundant with respect to said main microcontroller, which is optimized in functional terms and with respect to system reliability, while being simple and inexpensive to develop and implement.

The inverter control proposed thus aims to prevent damage to the electric machine due to overheating in a simple, economical and effective way, to protect against overvoltage and load dumps, and to avoid excessive braking of the vehicle equipped with the electric machine.

Related herein is a method for controlling an inverter comprising electronic switches and controlling an electric machine, the inverter and the electric machine being powered by a direct current bus known as a high-voltage bus. The inverter is controlled by a first control device such as a main microcontroller in a nominal operating mode, and the inverter is controlled by a second control device when the first control device fails. The second control device is adapted to apply a safety operating mode to the inverter.

The safety mode is chosen from:
an Active Short Circuit (ASC) mode, wherein certain electronic switches of the inverter are closed so as to short-circuit phases of the electric machine; and
a freewheeling (FW) mode, in which all the electronic switches of the inverter are open, putting the electric machine into freewheeling mode.

The method comprises, for selecting the safety mode to be applied:
determining the voltage on the high-voltage bus, and
if the voltage on the high-voltage bus is below a first voltage threshold, the FW mode is selected,
if the voltage on the high-voltage bus exceeds a second voltage threshold which is higher than the first voltage threshold, the ASC mode is selected,
if the voltage is between the first voltage threshold and the second voltage threshold inclusive, a parameter is determined which is distinct from the voltage on the high-voltage bus and representative of the ability of injecting energy by the electric machine onto said high-voltage bus in a risk-free manner, an absence of risk being determined when the parameter is less than a threshold value; and
if the parameter is greater than or equal to the threshold value, the ASC mode is selected,
if the parameter is lower than the threshold value, the FW mode is selected.

The proposed control of the inverter makes it possible to ensure functional safety and the absence of system deterioration in the event of failure of the first control device, through simple and effective selection of the safety mode to be applied. As the selection is based on two simple parameters, starting with the voltage on the HVDC bus, and another parameter which may be available or simple to measure (rotational speed of the electric machine, current in the phases of said machine, etc.), this selection can be carried out using simple electronic components, without requiring the use of programmable logic components or a second microcontroller. Taking into account a parameter representative of the ability of injecting electrical energy onto the high-voltage bus makes it possible in particular to limit the risks associated with such an injection, namely uncontrolled regeneration and excessive electrical braking of the electric machine when the system's high-voltage supply (the battery) is connected to the high-voltage bus, or overvoltage in the inverter when the system's high-voltage supply (the battery) is disconnected from the high-voltage bus.

Prior to the step of determining the voltage on the high-voltage bus, the second control device can apply the FW mode to the inverter. The FW mode can then be applied, for example, for a duration of between 1 us and 10 μs.

According to one embodiment, the parameter taken into account in the method is the rotational speed of the electric machine.

As the high-voltage bus is connected to a battery, the rotational speed threshold value can correspond to the rotational speed of the electric machine from which a rectified counter-electromotive force greater than the minimum battery voltage is generated.

The rotational speed threshold value for selecting the safety mode can, for example, be between 1000 rpm and 8000 rpm.

According to another embodiment, since the electric machine has phases, the parameter is the current in at least one of the phases of the electric machine when the inverter is operating in FW mode. The current threshold value in at least one of the phases of the electric machine can be, for example, the current value from which uncontrolled regeneration of the battery can occur, or a zero value to the nearest measurement uncertainty.

In this case, when the ASC mode is selected, when the ASC mode is selected, a passage of a predefined duration since the selection of the ASC mode followed by a switch to FW mode and a return to the step of determining the voltage on the high-voltage bus. This predefined duration may, for example, be between 1 second and 30 seconds.

Also related herein is a system comprising an inverter and an electric machine controlled by the inverter, the inverter comprising electronic switches, the system further comprising a direct current power bus known as a high-voltage bus. The system comprises a first control device such as a main microcontroller adapted to control the inverter in a nominal operating mode. The system also comprises a second control device adapted to control the inverter when the first control device fails. The second control device is adapted to apply a safety operating mode to the inverter.

The safety mode is chosen from:
an Active Short Circuit (ASC) mode, wherein certain electronic switches of the inverter are closed so as to short-circuit phases of the electric machine; and
a freewheeling (FW) mode, in which all electronic switches on inverter 4 are open, putting the electric machine into freewheeling mode.

In addition, the system comprises a device for determining the voltage on the high-voltage bus and the second electronic control device is configured so that:
if the voltage on the high-voltage bus ($U_{HVDC}$) is lower than a first voltage threshold, the FW mode is selected,
if the voltage on the high-voltage bus exceeds a second voltage threshold which is higher than the first voltage threshold, the ASC mode is selected,
if the voltage is between the first voltage threshold and the second voltage threshold inclusive, a parameter is determined which is distinct from the voltage on the high-voltage bus and representative of the ability of injecting energy by the electric machine onto said high-voltage bus in a risk-free manner, an absence of risk being determined when the parameter is less than a threshold value; and if the parameter is greater than or equal to the threshold value, the ASC mode is selected;

if the parameter is lower than the threshold value, the FW mode is selected.

The second control device can be an electronic circuit without a microprocessor.

Finally, related herein is an electric vehicle or a hybrid electric vehicle comprising a system as defined above.

The term "hybrid electric vehicle" refers to any vehicle that combines two drive modes, one of which involves an electric motor, typically a vehicle comprising an internal combustion engine and one (or more) electric motors. The methods and devices described herein are aimed in particular at motor vehicles.

BRIEF DESCRIPTION OF THE FIGURES

Other features and advantages will become more apparent in the description below.

In the appended drawings, given by way of non-limiting examples.

DETAILED DESCRIPTION

Figure 1:
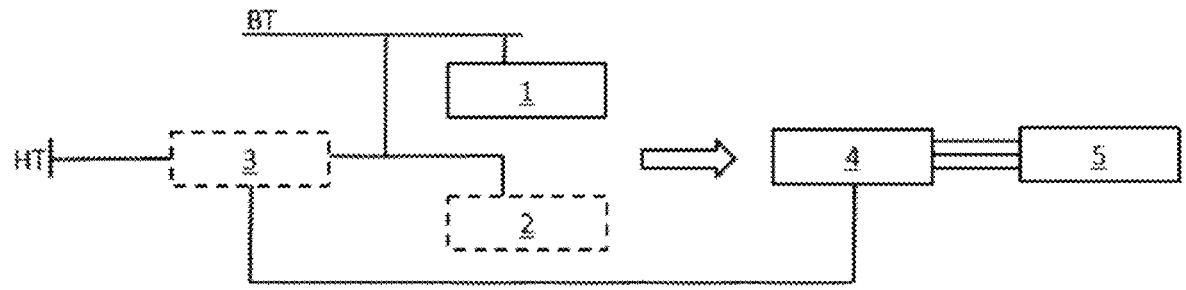
FIG. 1 schematically represents the general structure of an inverter control system.

FIG. 1 schematically illustrates, by way of example, the general structure of a control system for an inverter 4, which controls an electric machine 5 (in this case a traction machine for a motor vehicle). The control device comprises a first control device, namely a main microcontroller 1. The main microcontroller 1 is powered by a so-called low-voltage power supply BT. The low-voltage power supply is a direct current power supply, and generally comprises a battery, typically a 12V battery. During operation in nominal mode of the inverter 4, i.e. when no event such as a fault requires operation in a safety mode, the main microcontroller ensures control of the inverter.

The control system further comprises a second control device 2. In the known state of the art, the second control device is usually a second microcontroller. As explained below, the second control device can be formed in a much simpler way, in particular by an electronic board without a microcontroller, using only very simple logic circuits.

The second control device 2 is powered by the low-voltage power supply BT, or, if this is unavailable, by an auxiliary power supply 3.

The auxiliary power supply is itself supplied with electricity by a high-voltage power supply HT. In particular, the high-voltage power supply HT may comprise a traction battery of an electric vehicle, and may therefore have a voltage of between 200V and 800V (corresponding to the nominal voltage of the battery or other electrical energy source of the equipped vehicle).

The high-voltage power supply HT also supplies the power stage of the inverter 4, and ultimately the electric machine 5, via a high-voltage direct current bus (HVDC bus 6).

The main microcontroller and the second control device therefore collectively constitute a control system for applying, when necessary, a safety operating mode to the inverter (in particular the ASC mode or the FW mode described above).

In practice, the second control device 2 is only used in the event of a failure of the main microcontroller, rendering it incapable of controlling the inverter according to a nominal mode or safety mode.

Figure 2:
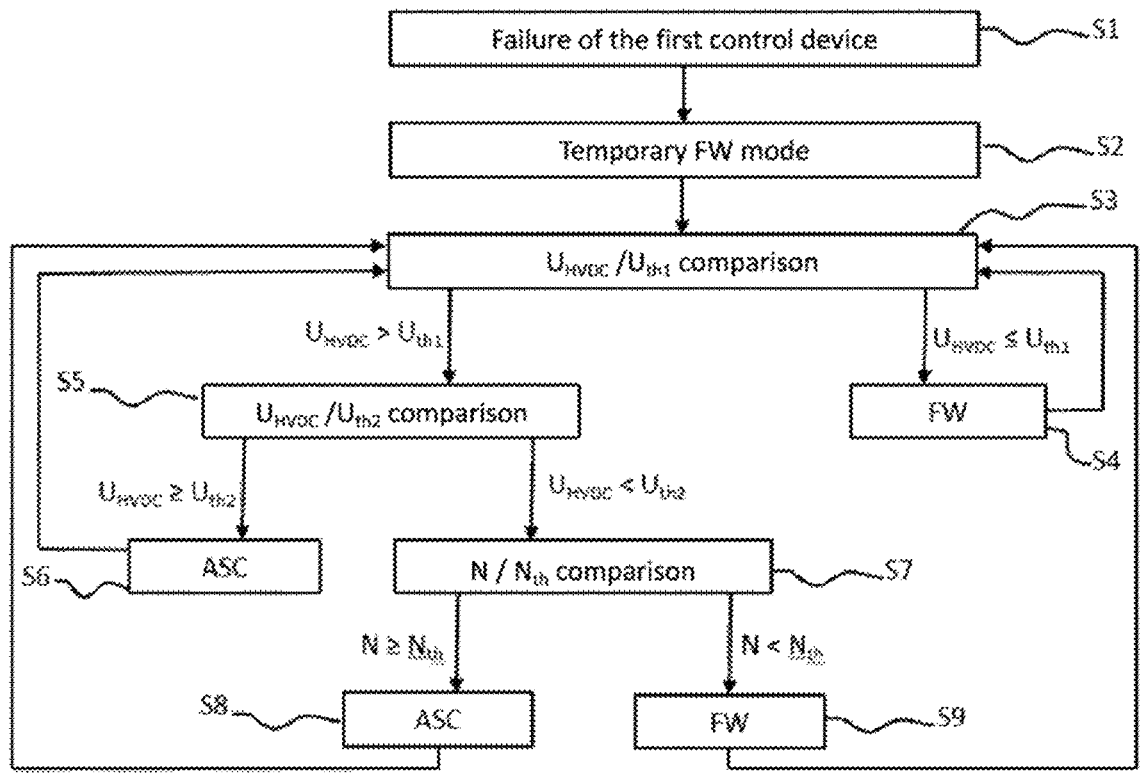
FIG. 2 shows, according to a flowchart, a method for controlling an inverter according to a first embodiment.

This can happen, for example, when the low-voltage power supply to said main microcontroller 1 is lost, or in the event of a software issue. That being said, the presence of the second control device, which is redundant with respect to the main microprocessor, makes it possible to cover any unforeseen failure of the latter. FIG. 2 shows, according to a flowchart, a method for controlling an inverter according to a first embodiment.

In a first step S1, it is detected that the first control device is faulty, so that correct control of the inverter can no longer be ensured by this first control device.

In a second step S2, the FW mode is applied by the second inverter control device. This is a temporary application. This prior switchover to FW mode avoids the risk associated with a direct switchover to ASC mode, in which the electronic switches of the power stage of the inverter located on the same side of the H-bridges formed in the inverter are closed. Switching directly from nominal operating mode to ASC mode could therefore lead to a situation known as cross conduction, if one of the H-bridges on the opposite side is still closed (switch closed), and cause inverter degradation.

In the so-called "freewheeling" mode, the electronic switches are all in the open state, and therefore do not allow current to flow.

It is therefore preferable to briefly apply the FW mode to the inverter, before applying the ASC mode, if necessary. This temporary default application of the FW mode can be carried out for a duration of between 1 µs and 10 µs, for example of the order of 3 µs. Once the desired duration has elapsed, it is then possible to switch (or not) to ASC mode, depending on the conditions described below.

In a third step S3, the voltage on the UVDC bus $U_{HVDC}$ is compared to a first voltage threshold $U_{th1}$. $U_{HVDC}$ can be determined by measurement. $U_{th1}$ is preferably a fixed, predetermined threshold, depending on the application considered.

If the voltage on the UVDC bus $U_{HVDC}$ is less than (or equal to) the first voltage threshold $U_{th1}$, the FW mode is applied (step S4).

In fact, by choosing a suitable first voltage threshold $U_{th1}$, it is possible to apply the FW mode without further consideration when necessary. Typically, if the first voltage threshold $U_{th1}$ corresponds to the safety power supply undervoltage lockout threshold (i.e. a predetermined minimum voltage that ensures correct operation of the second control device), application of the FW mode maintains the HVDC bus at a sufficient voltage to power said second control device.

If the voltage on the UVDC bus $U_{HVDC}$ is higher than the first voltage threshold $U_{th1}$, the voltage on the UVDC bus $U_{HVDC}$ is then compared with a second voltage threshold $U_{th2}$, in a fifth step S5. The second voltage threshold $U_{th2}$ is higher than the first voltage threshold $U_{th1}$.

If the voltage on the UVDC bus $U_{HVDC}$ is greater than (or equal to) the second voltage threshold $U_{th2}$, the ASC mode is applied (sixth step S6).

By choosing an appropriate second $U_{th2}$ voltage threshold, overvoltage phenomena, particularly due to load dump, are avoided. Typically, if the second voltage threshold $U_{th2}$ corresponds to the maximum battery voltage (high-voltage power source HT) in ASC mode, it must necessarily be applied to avoid the risk of overvoltage phenomena. In particular, the FW mode cannot in any case be applied without risk in this case.

If the voltage on the UVDC bus $U_{HVDC}$ is below the second voltage threshold $U_{th2}$ (i.e. $U_{HVDC}$ is between $U_{th1}$ and $U_{th2}$), a parameter other than $U_{HVDC}$ is taken into account to determine the safety operating mode to be applied to the inverter.

In this case, the rotational speed N of the electric machine is determined and used as a parameter. The rotational speed is determined, for example, by the signal from a position sensor fitted to it. Alternatively, the rotational speed can be determined on the basis of the frequency of the current in the phases of the electric machine.

The rotational speed N is compared with a rotational speed threshold value $N_{th}$, in a seventh step S7.

In particular, the rotational speed threshold $N_{th}$ may correspond to the rotational speed of the electric machine from which a rectified counter-electromotive force greater than the minimum battery voltage (voltage at its lowest acceptable state of charge) could occur, potentially leading to uncontrolled battery regeneration. The rotational speed threshold can be chosen to be lower than this rotational speed.

If the rotational speed N is greater than (or equal to) the rotational speed threshold value $N_{th}$, the ASC mode is applied (eighth step S8). The ASC mode must be applied in this case to avoid any risk of excessive braking or overvoltage. In this case, the braking generated by the electric machine is not excessive at this rotational speed.

If the rotational speed N is below the rotational speed threshold value $N_{th}$, the FW mode is applied (ninth step S9).

The rotational speed threshold is preferably chosen as high as possible, within the limits explained above. Indeed, the FW mode can be used with little or no risk of overheating the electric machine or inverter, while the FW mode does not generate significant braking which would be unacceptable at this low machine rotational speed (and therefore low vehicle speed).

The method described with reference to FIG. 2 is based on very simple parameter comparisons, it can be applied using very simple electronic components. In particular, the use of a microprocessor of a CPLD or FPGA is not necessary. As a result, the costs of design, manufacture, integration, etc. for the second control device are very low. Redundancy of the inverter's control function is thus achieved at very low cost, while ensuring the desired functions and safety.

Figure 3:
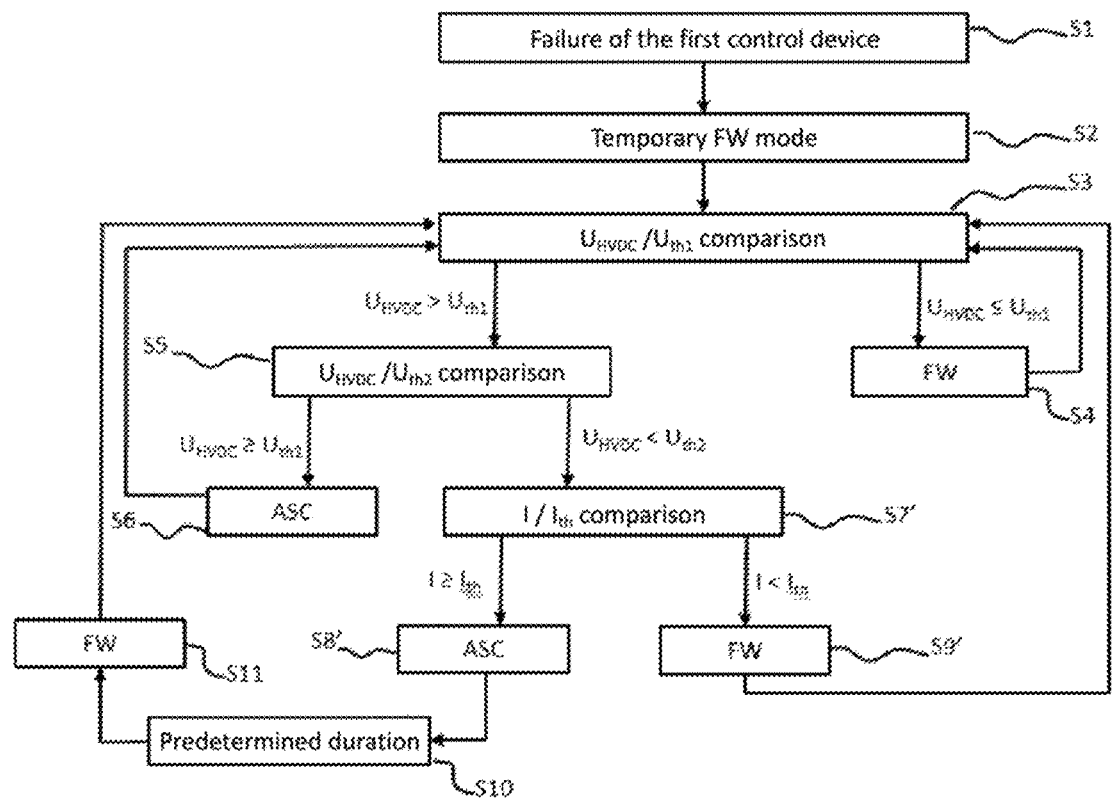
FIG. 3 shows, according to a flowchart, a method for controlling an inverter according to a second embodiment.

FIG. 3 shows, according to a flowchart, a method for controlling an inverter according to a second embodiment.

Steps S1 to S6 of the method described in FIG. 3 are identical to those of the method described with reference to FIG. 2, and therefore the description of FIG. 2 above can be referred to for these stages.

If, at the end of the fifth step S5, it is determined that the voltage on the UVDC bus $U_{HVDC}$ is less than the second voltage threshold $U_{th2}$ (i.e. $U_{HVDC}$ is between $U_{th1}$ and $U_{th2}$), as in the method described with reference to FIG. 3, a parameter distinct from $U_{HVDC}$ is then taken into account to determine the safety operating mode to be applied to the inverter.

In this case, the current I in at least one phase of the electric machine is determined and used as a parameter. It is important to note that this parameter is only relevant when the inverter is in FW mode (in ASC mode a phase current is necessarily generated, which would exceed the set threshold detailed below). Provided that the inverter was placed in FW mode in the second step S2 of the method, the first occurrence of the determination of the current I can be carried out without any additional special conditions.

The phase current I can be determined using a suitable sensor.

The current I is then compared with a current threshold value $I_{th}$. In particular, the current threshold value $I_{th}$ may correspond to a value from which uncontrolled regeneration of the battery may occur. Alternatively, the current threshold value may correspond to a zero value, to the nearest measurement uncertainty.

If the current I is below the current threshold value $I_{th}$, the FW mode is applied (ninth step S9').

In the absence of phase current, the FW mode can be used with little or no risk of causing of the overheating the electric machine or inverter, while significant braking which would not be acceptable is not generated by FW mode.

If current I is greater than (or equal to) the current threshold $I_{th}$, the ASC mode is applied (eighth step S8'). The ASC mode must be applied, which avoids overvoltage phenomena, while the braking generated by the electric machine is not excessive in this situation.

In this embodiment, once the ASC mode has been selected and applied, a predefined duration (e.g. a few seconds) is allowed to elapse in a tenth step S10.

The FW mode is then applied again (eleventh step S11). The method then returns to the third step S3.

Switching to FW mode in the eleventh step S11 maximizes the use of this safety mode, while making it possible to re-assess the low phase current condition in order to maintain the FW mode, or if necessary switch back to ASC mode (and again attempt to switch back to FW mode after the predetermined time has elapsed).

Of course, in any embodiment, if at any time the first control device is again capable of controlling the inverter, the second control device is deactivated and the first control device takes over the control of the inverter.

An inverter is thus enabled to be controlled in a safety mode in the event of failure of its main control device, in a simple and therefore cost-effective manner, while ensuring functional safety and limiting the risk of damage to the system, in particular to the electric machine, the inverter and the battery that powers them. The present methods and devices are particularly relevant in the context of an electric (or hybrid) vehicle, in particular a motor vehicle.

The invention claimed is:

1. A method for controlling an inverter which controls an electric machine, the inverter comprising electronic switches,
   wherein the inverter and the electric machine are powered by a high-voltage bus, said inverter being controlled by a first control device when in a nominal operating mode, and said inverter being controlled by a second control device when the first control device fails,
   the second control device being adapted to apply a safety operating mode to the inverter, wherein the safety operating mode is chosen from:
   an Active Short Circuit (ASC) mode in which certain electronic switches of the inverter are closed so as to short-circuit phases of the electric machine; and
   a freewheeling (FW) mode in which all the electronic switches of the inverter are open, putting the electric machine into freewheeling mode,
   wherein the method for selecting the safety mode to be applied comprises measuring a voltage ($U_{HVDC}$) on the high-voltage bus, wherein
   if the voltage ($U_{HVDC}$) is below a first voltage threshold ($U_{th1}$), FW mode is applied, if the voltage ($U_{HVDC}$) exceeds a second voltage threshold ($U_{th2}$) which is higher than the first voltage threshold ($U_{th1}$), ASC mode is applied, and if the voltage ($U_{HVDC}$) is between the first voltage threshold ($U_{th1}$) and the second voltage threshold ($U_{th2}$) inclusive, a parameter is determined which is distinct from the voltage on the high-voltage bus, said parameter being representative of the possibility of injecting energy by the electric machine into said high-voltage bus without risk, an absence of risk being determined when the parameter is below a parameter threshold value; wherein if the parameter is greater than or equal to the parameter threshold value, the ASC mode is implemented; and if the parameter is below the parameter threshold value, the FW mode is applied.

2. The method for controlling an inverter according to claim 1, wherein, prior to the step for determining the voltage on the high-voltage bus, the second control device applies the FW mode to the inverter.

3. The method for controlling an inverter according to claim 2, wherein the FW mode is applied for a duration of between 1 μs and 10 μs.

4. The method for controlling an inverter according to claim 2, wherein, when the electric machine has phases, wherein the parameter is the current in at least one of the phases of the electric machine when the inverter is operating in FW mode, and wherein the parameter threshold is a current threshold value ($I_m$).

5. The method for controlling an inverter according to claim 4, wherein the current threshold value ($I_{th}$) in at least one of the phases of the electric machine is the current value from which uncontrolled regeneration of the battery can occur, or a zero value to the nearest measurement uncertainty.

6. The method for controlling an inverter according to claim 4, the method further comprising, when ASC mode is selected, the inverter is switched to FW mode after passage of a predefined duration after application of ASC mode, said method then returning to the step of determining the voltage on the high-voltage bus.

7. The method for controlling an inverter according to claim 6, wherein said predefined duration is between 1 second and 30 seconds.

8. The method for controlling an inverter according to claim 1, wherein the parameter is the rotational speed of the electric machine and the parameter threshold is a rotational speed threshold value ($N_{th}$).

9. The method for controlling an inverter according to claim 8, wherein, with the high-voltage bus connected to a battery, the rotational speed threshold value corresponds to the rotational speed of the electric machine from which a rectified counter-electromotive force greater than the minimum battery voltage is generated.

10. The method for controlling an inverter according to claim 8, wherein the rotational speed threshold value ($N_{th}$) for safety mode selection is between 1000 rpm and 8000 rpm.

11. A system comprising an inverter and an electric machine controlled by the inverter, the inverter comprising electronic switches, the system further comprising a high-voltage bus, the system comprising a first control device adapted to control the inverter in a nominal operating mode and a second control device adapted to control the inverter when the first control device fails, the second control device being adapted to apply a safety operating mode to the inverter, wherein the safety mode is chosen from:

an Active Short Circuit (ASC) mode in which certain electronic switches of the inverter are closed so as to short-circuit phases of the electric machine; and a freewheeling (FW) mode in which all the electronic switches of the inverter are open, wherein the system comprises a device for determining the voltage ($U_{HVDC}$) on the high-voltage bus;

wherein, the second electronic control device is configured such that:

if the voltage ($U_{HVDC}$) is below a first voltage threshold ($U_{th1}$), FW mode is applied, if the voltage ($U_{HVDC}$) exceeds a second voltage threshold ($U_{th2}$) which is higher than the first voltage threshold ($U_{th1}$), ASC mode is applied, and if the voltage ($U_{HVDC}$) is between the first voltage threshold ($U_{th1}$) and the second voltage threshold ($U_{th2}$) inclusive, a parameter is determined which is distinct from the voltage on the high-voltage bus and representative of the possibility of injecting energy by the electric machine into said high-voltage bus without risk, an absence of risk being determined when the parameter is below a parameter threshold value; wherein if the parameter is greater than or equal to the parameter threshold value, ASC mode is applied; and if the parameter is below the parameter threshold value, FW mode is applied.

12. The system according to claim 11, wherein the second control device comprises an electronic circuit without a microprocessor or programmable logic counter.

13. An electric vehicle or hybrid electric vehicle comprising a system according to claim 11.

14. The system according to claim 11, wherein the first control device is a main microcontroller.

* * * * *